(12) United States Patent
Suzuki et al.

(10) Patent No.: US 7,926,732 B2
(45) Date of Patent: Apr. 19, 2011

(54) OCR SHEET-INPUTTING DEVICE, OCR SHEET, PROGRAM FOR INPUTTING AN OCR SHEET AND PROGRAM FOR DRAWING AN OCR SHEET FORM

(75) Inventors: Tomohisa Suzuki, Yokohama (JP); Hiroyuki Mizutani, Yokohama (JP); Akihiro Uda, Yokohama (JP); Naoaki Kodaira, Hino (JP); Toshimasa Dobashi, Kawasaki (JP); Akio Furuhata, Fuchu (JP)

(73) Assignees: Kabushiki Kaisha Toshiba, Tokyo (JP); Toshiba Soluitons Corporation, Tokyo (JP)

( * ) Notice: Subject to any disclaimer, the term of this patent is extended or adjusted under 35 U.S.C. 154(b) by 1055 days.

(21) Appl. No.: 11/727,983

(22) Filed: Mar. 29, 2007

(65) Prior Publication Data
US 2007/0228168 A1  Oct. 4, 2007

(30) Foreign Application Priority Data
Apr. 3, 2006  (JP) ................ P2006-102063

(51) Int. Cl.
*G06K 19/06* (2006.01)
(52) U.S. Cl. ........ 235/494; 235/435
(58) Field of Classification Search .......... 235/494, 235/435, 456
See application file for complete search history.

(56) References Cited

U.S. PATENT DOCUMENTS

| | | | | |
|---|---|---|---|---|
| 5,038,393 | A | * | 8/1991 | Nanba ............ 382/287 |
| 7,120,316 | B2 | * | 10/2006 | Kaneda ........... 382/294 |
| 2002/0050982 | A1 | * | 5/2002 | Ericson ........... 345/173 |
| 2003/0204816 | A1 | * | 10/2003 | Simard et al. ...... 715/517 |
| 2007/0009158 | A1 | * | 1/2007 | Geva et al. ......... 382/209 |
| 2007/0172123 | A1 | * | 7/2007 | Komatsubara et al. ... 382/175 |

FOREIGN PATENT DOCUMENTS

| | | |
|---|---|---|
| JP | 6-139419 | 5/1994 |
| JP | 6-342481 | 12/1994 |
| JP | 8-305791 | 11/1996 |
| JP | 2001-195541 | 7/2001 |
| JP | 2001-229312 | 8/2001 |
| JP | 2005-284927 | 10/2005 |

* cited by examiner

*Primary Examiner* — Ahshik Kim
(74) *Attorney, Agent, or Firm* — Finnegan, Henderson, Farabow, Garrett & Dunner, L.L.P.

(57) ABSTRACT

An inputting device which includes an image input section for inputting an image of a containing areas in which information to be inputted is filled in and patterns representing at least reference positions to define the positions of corresponding areas and size information of corresponding areas; a memory section for storing the image of the input by the image input section; a pattern recognizing section for detecting the reference positions from the patterns in the image which is stored in the memory section and recognizing size information of the areas; an area specifying section for specifying the positions of the areas from the reference positions detected by the pattern recognizing section and the size information of the areas; and an area inputting section for inputting images in the areas defined by the area specifying section.

12 Claims, 11 Drawing Sheets

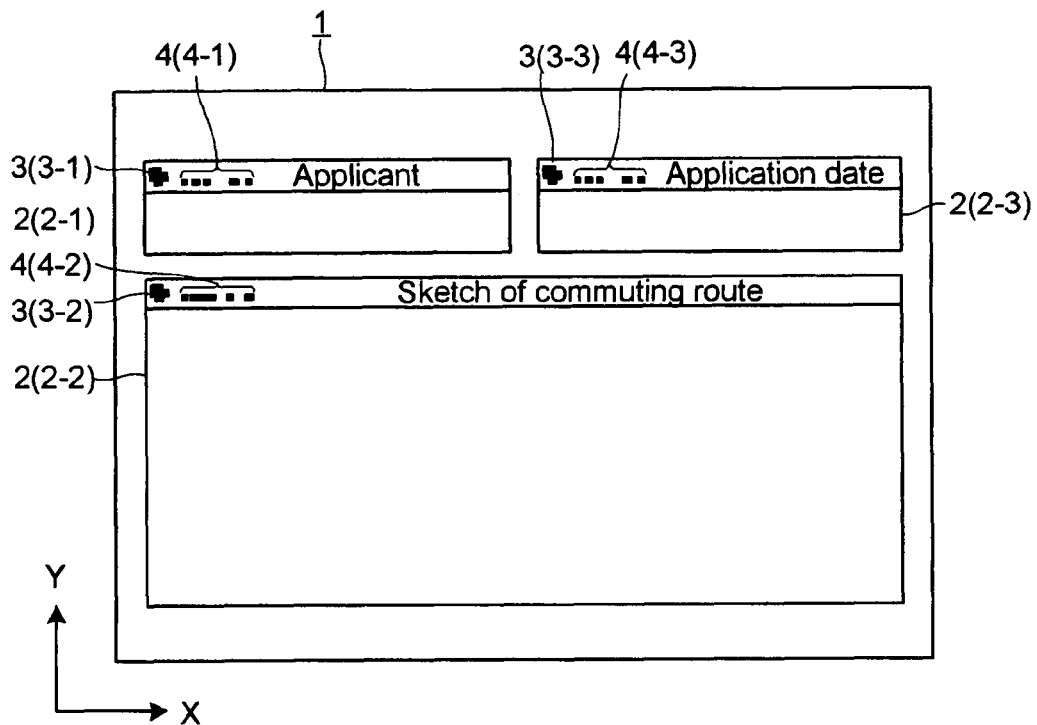
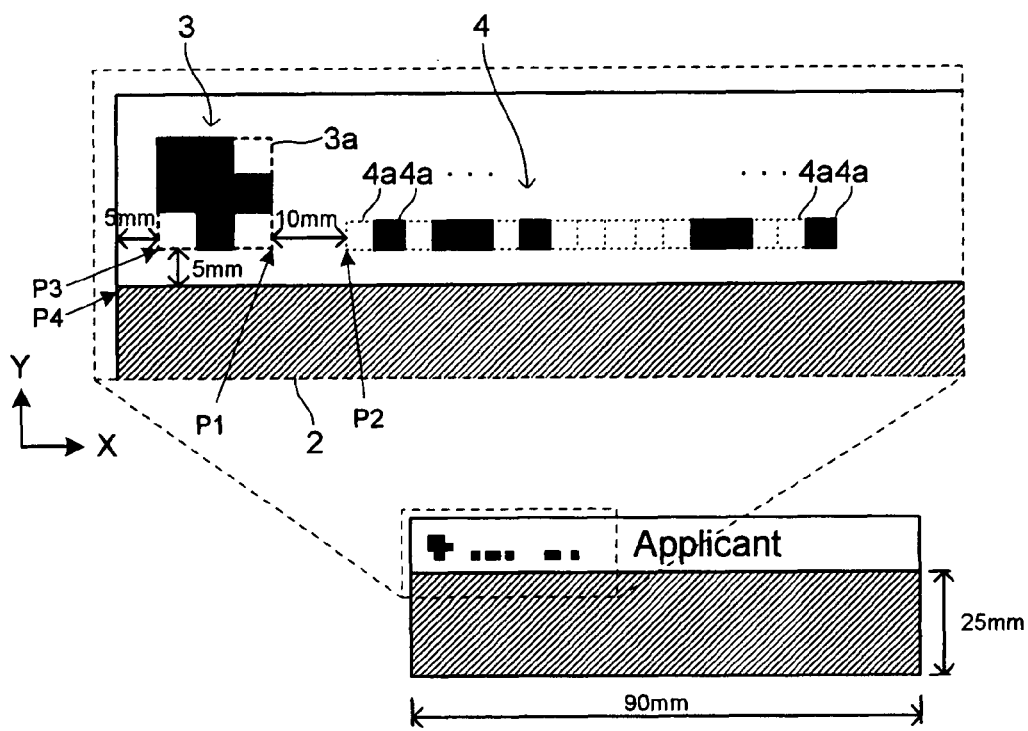

| | number of area | width | height | offset | | content |
|---|---|---|---|---|---|---|
| | | | | horizontal | vertical | |
| | 5 | | | | | |
| area1 | | 150 | 25 | -5 | 5 | address |
| area2 | | 90 | 25 | -5 | 95 | name |
| area3 | | 90 | 25 | -5 | 185 | name |
| area4 | | 90 | 25 | -5 | 275 | name |
| area5 | | 90 | 25 | -5 | 365 | name | representing contents
5,150,25,-5,5,address,90,25,-5,name...

20 OCR sheet form rendering device

31 — applicant,10,30,90,25,name
32 — application date,110,30,90,25,date
33 — sketch of commuting route,10,60,190,70,drawing

34

Input of information to be filled in frame

Title: Applicant — 35

Content: Name
 Drawing
37 Name
 Amount of money
 Date — 36

Ok   Cancel

| Area library | | |
|---|---|---|
| Title | Size | Content |
| Commnting route | 190mm x 70mm | Drawing |
| Applicant | 90mm x 25mm | Name |
| Application date | 190mm x 70mm | Date |
| Stamp of manager | 30mm x 30mm | Date |
| Stamp of applicant | 30mm x 30mm | Shading |

FIG. 20

| Area library | | |
|---|---|---|
| Title | Size | Content |
| Commnting route | 190mm x 70mm | Drawing |
| Application date | 190mm x 70mm | Date |
| *Indefinite* | 30mm x 30mm | Shading |

FIG. 21

| Area library | | |
|---|---|---|
| Title | Size | Content |
| Comm | | |
| Applic | | |
| ***Inde | | |

Input of indefinite attribute

Title: Stamp of person in charge

Ok   Cancel

43

OCR SHEET-INPUTTING DEVICE, OCR SHEET, PROGRAM FOR INPUTTING AN OCR SHEET AND PROGRAM FOR DRAWING AN OCR SHEET FORM

CROSS-REFERENCE TO RELATED APPLICATIONS

This application is based upon and claims the benefit of priority from the prior Japanese Patent Application No. 2006-102063 filed on-Apr. 3, 2006; the entire contents which are incorporated herein by reference.

BACKGROUND

1. Field of the Invention

The present invention relates to an OCR sheet-inputting device, an OCR sheet form drawing device, an OCR sheet, a program for an OCR sheet and a program for drawing an OCR sheet form, whereby an area with information to be input is detected in an OCR sheet such that the information is input through character recognition or the like.

2. Description of the Related Art

In the use of an OCR sheet-inputting device, an area containing information such as characters to be input (hereinafter, called as an "area" is detected in an OCR sheet page image (hereinafter, called as an "OCR sheet image") so that the information can be recognized as character information.

As a method to detect areas to be inputted in the OCR sheet image, a mark to be easily recognized is arranged at the corresponding position related to the area to be input such that the position of the area to be input is determined from the position of the detected mark as reference. For example, it is disclosed in Patent Document No. 1 that the line position on which the area to be input depends is represented by a given mark.

[Patent Document No. 1] Japanese Patent Laid-open Application No. 2001-195541, paragraph [0013] and FIG. 2

In the case that the position of the area to be input is determined from the position of the detected mark, however, if the size of the area to be input is not recognized by the OCR sheet-inputting device, the position and size of the area to be input cannot be determined in the OCR sheet. Therefore, when a plurality of areas with the respective different sizes to be input are filled in the OCR sheet so that the positions of the areas to be input can be detected and thus, the information such as characters contained in the areas to be input are recognized, such an OCR sheet form as being capable of feeding off the position information of the area to be input in the OCR sheet by the OCR sheet-inputting device is desired.

SUMMARY

It is an object of the present invention, in view of the above-described problem, to provide an OCR sheet-inputting device which can determine the position of an area to be input in an OCR sheet on information obtained from an OCR sheet form. It is an also object of the present invention to provide an OCR sheet form drawing device which can easily draw an OCR sheet form so as to get, by the OCR sheet-inputting device, the information related to an lying position of the area to be input in the OCR sheet. Moreover, it is a further object of the present invention to provide an OCR sheet, a program for inputting the OCR sheet and a program for drawing the OCR sheet form.

In order to achieve the above objects, this invention relates to an OCR sheet-inputting device, comprises: an OCR sheet image input section for inputting an image of an OCR sheet containing an area in which information to be input is arranged and a pattern representing at least a reference position to define the position of the area and a size information of the area; a memory section for storing the image of the OCR sheet input by the OCR sheet image input section; a pattern recognizing section for detecting the reference position from the pattern of the image of the OCR sheet which is stored in the memory section and recognizing a size information of the area; an area specifying section for specifying the position of the area from the reference position detected by the pattern recognizing section and the size information of the area; and an area inputting section for inputting an image in the area defined by the area specifying section.

The area may be shaped rectangular and the area specifying section may be configured to determine the position of a corner already defined in the area by the reference position so as to determine the position of the area on the position of the corner and the size information of the area.

According to the present invention, the position and size of the area to be input in the OCR sheet can be determined by the pattern obtained from the OCR sheet form.

The pattern may include a pattern configured such that a rotational shape of the pattern is not matched with the original shape of the pattern under no rotation. In this case, the rotational angle of the OCR sheet image can be determined two-dimensionally by the pattern shape of the mark at detection so as to correct the position of the OCR sheet image regularly when the OCR sheet image is rotated by a given angle.

This invention also relates to an OCR sheet form drawing device, comprises: an area specifying section for acquiring a definition information to define an area in which information to be input is arranged; an area generating section for generating the area by the definition information gotten by the area specifying section; a pattern generating section for generating a pattern to represent at least a reference position related to the position of the area and a size information of the area on the definition information gotten by the area specifying section; and a form data generating section for generating an OCR sheet form data which is obtained by the combination of the area which is generated by the area generating section and the pattern which is generated by the pattern generating section.

The definition information may include information related to the position and size of the area.

The OCR sheet form drawing device may include an area information reusing section for storing, as a library, an attribute information containing a size information of the area, loading the attribute information of the area stored as the library by the indication of a user, and reusing the attribute information for generating a new area.

According to the OCR sheet form drawing device of the present invention, such an OCR sheet form as being capable of acquiring, by the OCR sheet-inputting device, the information related to the position and size of the area to be input in the OCR sheet can be easily drawn.

According to the present invention, the position and size of an area to be input in an OCR sheet can be determined by information obtained from the corresponding OCR sheet form. Also, according to the OCR sheet form drawing device of the present invention, such an OCR sheet form as being capable of acquiring, by the OCR sheet-inputting device, the information related to the position and size of the area to be input in the OCR sheet can be easily drawn.

BRIEF DESCRIPTION OF THE DRAWINGS

FIG. 1 is a schematic view showing an OCR sheet according to an embodiment of the present invention.

FIG. 2 is a schematic view showing an OCR sheet form pattern in the OCR sheet shown in FIG. 1 in detail.

FIG. 20 is a schematic view showing a displaying example of registration information containing indefinite information in a library.

FIG. 21 is a schematic view showing a GUI which is utilized by a user in the indication of the description of indefinite information.

DETAILED DESCRIPTION

Figure 3:
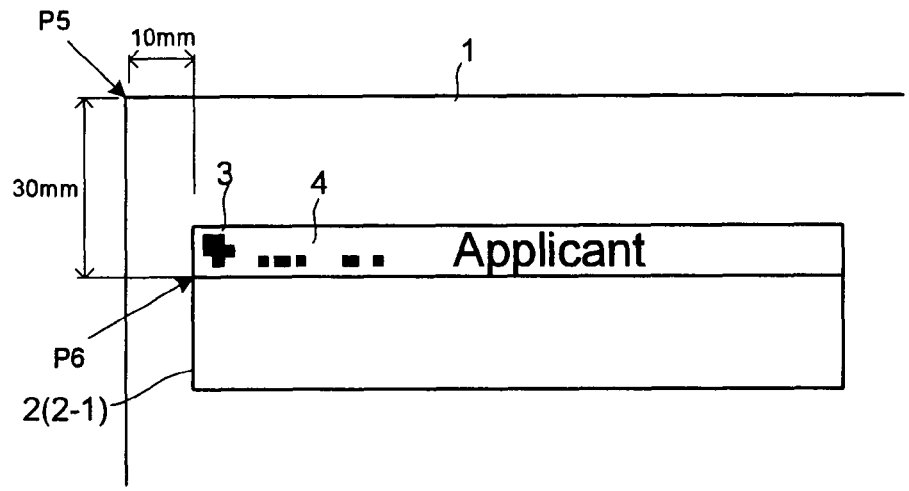
FIG. 3 is an explanatory view showing the relation in position between the reference position mark and the area to be input.

Hereinafter, embodiments of the present invention will be described with references to the drawings. The drawings, though referred to in describing the embodiments of the present invention, are provided only for an illustrative purpose and in no way to limit the present invention.

FIG. 1 is a schematic view showing an OCR sheet to be read by an OCR sheet-inputting device according to an embodiment of the present invention.

As shown in FIG. 1, the OCR sheet 1 includes one or more areas 2 (2-1, 2-2, 2-3) to be input. The "area to be input" 2 means an area in which some characters (character string) or an image is written and means an area to be input through character recognition or image extraction. Around each area to be input are arranged a reference position mark 3 (3-1, 3-2, 3-3) and an attribute information pattern 4 (4-1, 4-2, 4-3) which function as the reference position to define the area to be input and the pattern representing at least the size information of the area to be input, respectively. In other words, in the OCR sheet 1, a reference position mark 3 (3-1, 3-2, 3-3) and an attribute information pattern 4 (4-1, 4-2, 4-3) are provided for each area to be input. Herein, the reference position mark 3 functions to determine the position of the area 2 to be input and the attribute information pattern 4 which are located in the neighborhood thereof. The attribute information pattern 4 functions to represent at least the size information of the area 2 to be input.

FIG. 2 is a schematic view showing an OCR sheet form pattern consisting of the reference position mark 3 and the attribute information pattern 4 in the OCR sheet 1 shown in FIG. 1 in detail.

The reference position mark 3 is required to be initially detected as a pattern so as to determine the rotational angle and the reference position of the OCR sheet image. The reference position mark 3 is detected through the matching for the reference pattern contained in the OCR sheet-inputting device. The reference position mark 3 consists of a pattern of which the rotational shaped pattern cannot be matched with the original pattern when the reference position mark 3 is rotated. In this point of view, the reference position mark 3 consists of a two-dimensional shaped pattern so that the reference direction of the OCR sheet image can be determined by the shape of the reference position mark 3. In this embodiment, the reference position mark 3 is divided into rectangular (square) nine sections (3×3) so that some of the sections are colored and the others are left uncolored so as to satisfy the above-described requirements.

In the OCR sheet 1, the relative position between the reference position mark 3 and the attribute information pattern 4 is defined. For example, the left lower corner P2 of the attribute information pattern 4 is located at the position 10 mm right from the right lower corner P1 of the outline 3a of the reference position mark 3. As described above, since the reference position mark 3 consists of the two dimensional pattern so as to determine the regular direction of the OCR sheet, the right lower corner P1 of the outline 3a of the reference position mark 3 means the right lower corner of the outline of the reference position mark 3 when the reference position mark 3 is arranged regularly. In this way, since the relative position between the reference position mark 3 and the attribute information pattern 4 is defined, the position of the attribute information pattern 4 can be determined by the position of the reference position mark 3. Herein, the reference position mark 3 is not always limited to the one shown in this embodiment, and may be applied to any one as long as the rotational shaped pattern of the reference position mark 3 is not identical with the original pattern thereof. Moreover, it is not always required to prepare the reference position mark 3 separately from the attribute information pattern 4. For example, the attribute information pattern 4 may function as the reference position mark 3.

In this embodiment, the attribute information pattern 4 represents a binary bit array by filling some of the bit recording areas 4a which are arranged in equal pitch. For example, a bit value "1" may be represented by a filled bit recording area 4a and a bit value "10" may be represented by an unfilled bit recording area 4a. The attribute information pattern 4 may consist of bar codes, two-dimensional codes, characters or a combination thereof, instead of the binary bit array.

As the attribute information for the area to be input which is represented by the attribute information pattern 4, the horizontal and vertical size of the area 2 to be input and the kind of the contents may be described. Moreover, the attribute information pattern 4 may include information other than information related to the area 2 to be input. For example, the attribute information pattern 4 may include a drawing date and time of the form of the OCR sheet, a creator for the form thereof, an identifier of another area to be input related with the intended area 2 to be input or other information related to the area 2.

Then, the relationship between positions of the reference position mark 3 and the area 2 to be input will be described.

With the OCR sheet 1, the relative position between the reference position mark 3 and the area 2 to be input is defined. As shown in FIG. 2, for example, the left upper corner P4 of the area 2 to be input is defined at the position that is shifted from the left lower corner P3 of the reference position mark 3 by 5 mm in the left direction and 5 mm in the downward direction, respectively. Since the reference position mark 3 can determine the regular direction of the OCR sheet by the two dimensional shape, the left lower corner P3 of the reference position mark 3 means a left lower corner of the reference position mark 3 when the reference position mark 3 is arranged regularly. In this way, since the relationship between the positions of the reference position mark 3 and the area 2 to be input is defined, the position of a given corner (e.g., the left upper corner P4) can be determined from on a prescribed corner (e.g., the left lower corner P3) of the reference position mark 3.

Instead of determining the relationship between the positions of the reference position mark 3 and the area 2 to be input, information which determines the relative position may be added as an attribute information to the attribute information pattern 4 so that the position of the area 2 to be input can be determined by the position of the reference position mark 3.

Moreover, instead of using the reference position mark 3 to determine the position of the area 2 to be input, as shown in FIG. 3, for example, the two dimensional lengths between the left upper corner P5 of the OCR sheet 1 and the left upper corner P6 of the area 2 to be input may be added to the attribute information pattern 4, thereby determining the position of the area 2 to be input. In the embodiment related to FIG. 3, the left upper corner P6 of the area 2 to be input containing the name of an applicant is defined at the position that is 10 mm right and 30 mm under the left upper corner P5 of the OCR sheet 1. Another area 2 (2-2, 2-3) to be input may be defined in the same manner as described above.

Figure 4:
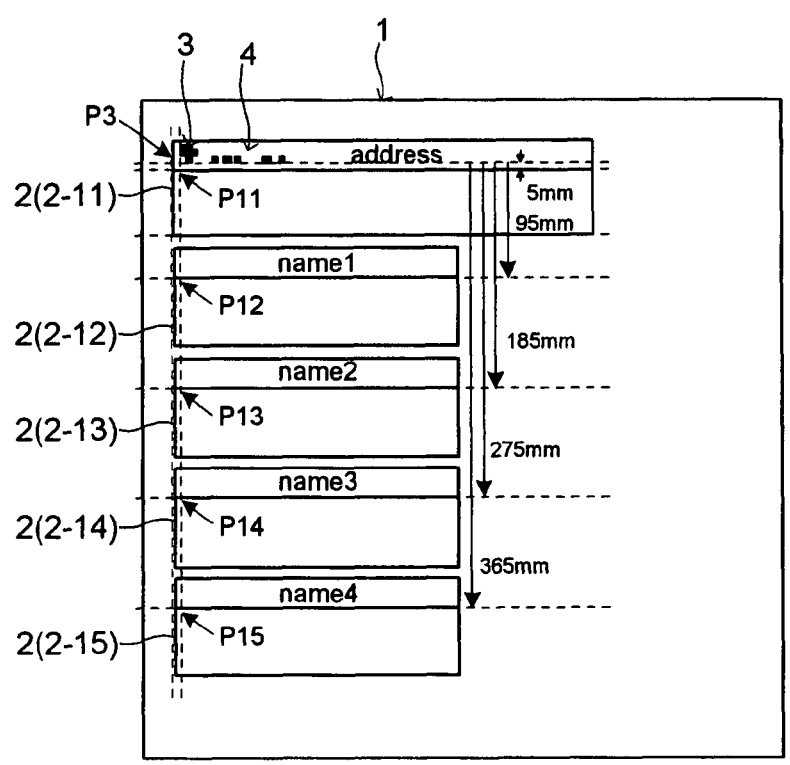
FIG. 4 is an explanatory view for the representation of the attribute information contained in a plurality of areas to be input by a single attribute information pattern.

Then, as shown in FIG. 4, the method to represent the attribute information contained in the areas 2 (2-11, 2-12, 2-13, 2-14, 2-15) by a single attribute information pattern 4 will be described.

Figures 5, 6:
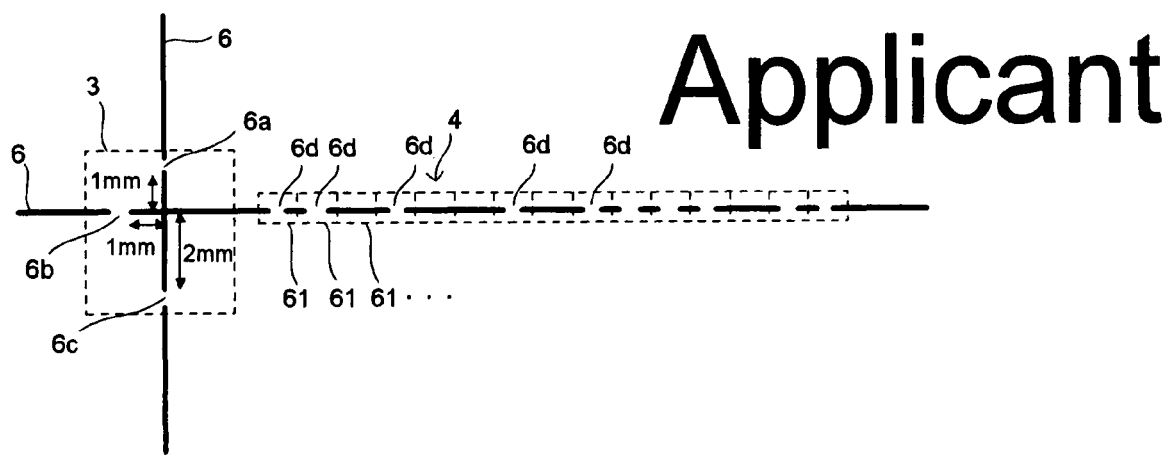
FIG. 5 is a table view for the attribute information contained in the areas to be input which are represented by a single attribute information pattern.
FIG. 6 is a schematic view showing another OCR sheet form pattern in the OCR sheet.

FIG. 5 is a table view for the attribute information contained in the areas 2 to be input which are represented by a single attribute information pattern 4. Actually, the information (number of area, attribute information per area to be input) designated by the dot line in the table is represented by the attribute information pattern 4. In this way, the horizontal and vertical sizes of the areas 2 (2-11, 2-12, 2-13, 2-14, 2-15), the classified contents of the areas 2 (2-11, 2-12, 2-13, 2-14, 2-15), and the horizontal and vertical offset values (unit: mm) of the left upper corners P11, P12, P13, P14, P15 of the areas 2 for the left lower corner P3 of the reference position mark 3 are represented by the attribute information pattern 4. In the OCR sheet-inputting device in this embodiment, therefore, by detecting and recognizing the attribute information pattern 4, the positions of the areas 2 can be determined simultaneously, therefore processing speed is improved.

Moreover, other information (identification number, coordinates) to define another area 2 to be input may be contained in the attribute information pattern 4. For example, when Chinese characters and the pronunciation written in kana are filled in separate areas, the information related to one area may be added to the attribute information pattern related to another area. In this case, when the OCR sheet is input by the OCR sheet-inputting device, the character recognition results of the Chinese characters and the pronunciations are referred together to check or correct the validity of the character recognition results. Moreover, each money amount, the corresponding subtotal and total of amounts may be filled to the areas 2 to be input. In this case, the information related to one area may be added to the attribute information pattern related to another area so that the minor and total amount of money can be checked when the OCR sheet is input by the OCR sheet-inputting device.

Then, a modified embodiment of OCR sheet form will be described.

FIG. 6 is a schematic view showing another OCR sheet form pattern in the OCR sheet. In this embodiment, the reference position mark 3 and the attribute information pattern 4 are formed in the ruled line 6 corresponding to the boundary of the area to be input.

The reference position mark 3 is characterized by the intersection of the vertical line 6 and the horizontal line 6 and the distances to the gaps 6a, 6b, 6c in the lines 6, 6 from the intersection. In this embodiment, the gap 6a is positioned at the upper side of the vertical line 6 from the intersection by 1 mm. The gap 6b is positioned at the left side of the horizontal line 6 from the intersection by 1 mm. The gap 6c is positioned at the lower side of the vertical line 6 from the intersection by 2 mm.

Besides, the attribute information pattern 4 is characterized by the gaps 6d of the horizontal line 6. Concretely, the attribute information pattern 4 is characterized by the binary bit array that is formed by opening the gaps 6d in the horizontal line 6 within the corresponding bit recording areas 61. Herein, the bit recording areas 61 are arranged one another in equal space. In this case, a bit number "0" may be represented by the bit recording area 61 with the gap 6d and a bit number "1" may be represented by the bit recording area 61 without gap 6d.

By utilizing the pattern in this embodiment, since the OCR sheet form includes the reference position mark 3 and the attribute information pattern 4, it is not necessary to form separate figures for the reference position mark 3 and the attribute information pattern 4.

Then, the OCR sheet-inputting device for the OCR sheet 1 will be described.

In this embodiment, the OCR sheet-inputting device is implemented as a typical computer hardware, which is consisted of a CPU, a memory device (ROM, RAM), an input device (key board, mouse), a displaying device and the like, and a software for inputting an OCR sheet. Alternatively, the OCR sheet-inputting program may be run by plural computers which are connected to each other via communication medium. Alternatively, a part or all of the OCR sheet-inputting may be implemented as a dedicated hardware. In this embodiment, the OCR sheet-inputting device may be configured to input the OCR sheet image which is read by an image scanner connected with a computer or which is read in an external scanner and is transferred via a transfer medium or a memory medium.

Figure 7:
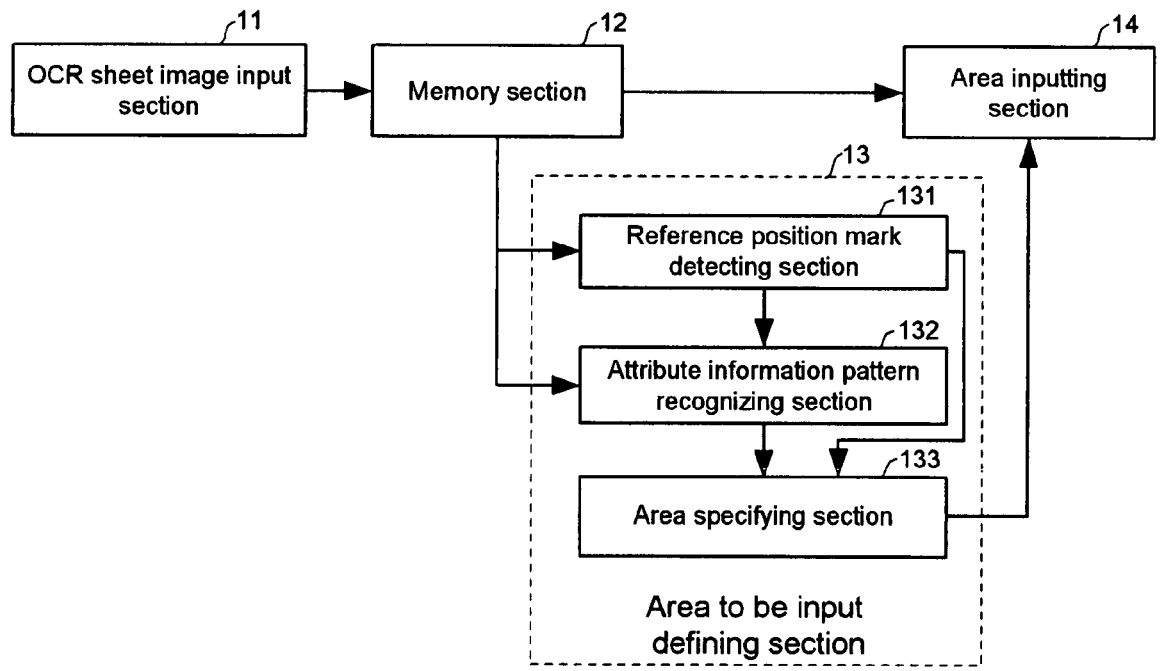
FIG. 7 is a functional block diagram for the OCR sheet-inputting device in the embodiment of the present invention.

FIG. 7 is a functional block diagram for the OCR sheet-inputting device in this embodiment.

As shown in FIG. 7, in this embodiment, the OCR sheet-inputting device 10 includes an OCR sheet image inputting section 11, a memory section 12, an area to be input defining section 13, and an area inputting section 14. These sections are operated by a computer and a program that is installed in the computer.

The OCR sheet image inputting section 11 functions to input OCR sheet image data which are read in a scanner connected with the computer or which are obtained via a transfer medium or memory medium, and then, functions to store the OCR sheet image data in the memory section 12 such as a RAM.

The area to be input defining section 13 recognizes the pattern of the OCR sheet image stored in the memory section 12 so as to determine the position of the area 2 to be input in the OCR sheet image. Concretely, the area to be input defining section 13 includes a reference position mark detecting section 131, an attribute information pattern recognizing section 132, and an area defining section 133. The reference position mark detecting section 131 and the attribute information pattern recognizing section 132 correspond to a pattern recognizing section in the present invention. The reference position mark detecting section 131 is configured to detect the reference position mark 3 in the OCR sheet data pattern. The attribute information pattern recognizing section 132 is configured to determine the position of the attribute information pattern 4 on the position of the reference position mark 3 which is detected by the reference position mark detecting section 131 in accordance with the relative position between the reference position mark 3 and the attribute information pattern 4, and recognize the attribute information pattern 4 so as to obtain the attribute information related to the area 2 to be input. Since the relative position between the reference position mark 3 and the area 2 to be input is defined two-dimensionally, the area defining section 133 can determine the position of the area 2 to be input by the position of the reference position mark 3 detected by the reference position mark detecting section 131 and the size information of the area 2 to be input contained in the attribute information related to the area 2 to be input which is obtained by the attribute information pattern recognizing section 132.

The area inputting section 14 provides predetermined information processing functions such as character recognition or image extraction for the image data of the area 2 to be input which is defined at the area to be input defining section 13.

Figure 8:
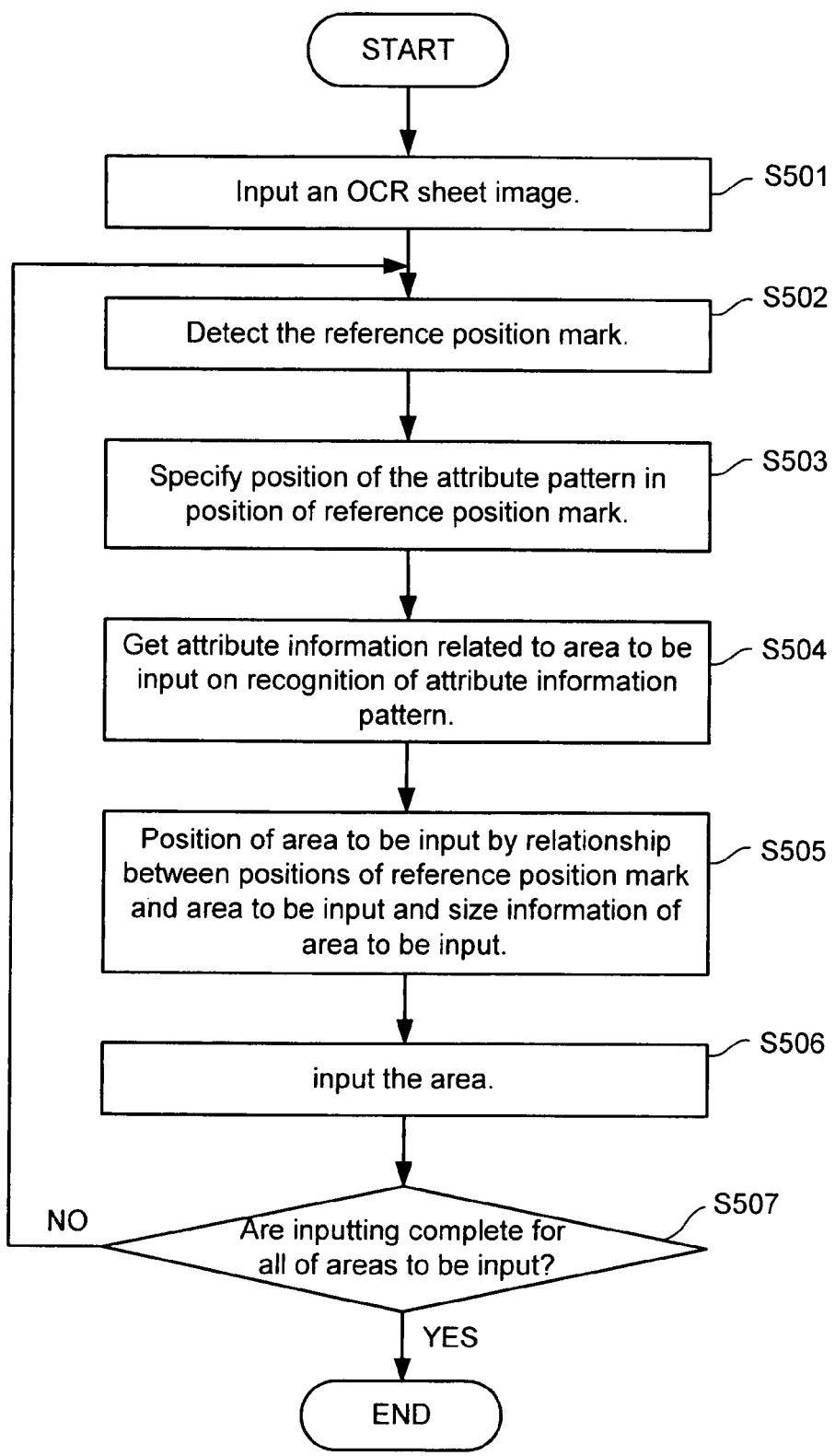
FIG. 8 is a flow chart for explaining the operation of the OCR sheet-inputting device in FIG. 7.

Then, the operation of the OCR sheet-inputting device 10 in this embodiment will be described. FIG. 8 is a flow chart to explain the operation of the OCR sheet-inputting device 10 in FIG. 7.

First of all, the OCR sheet image inputting section 11 inputs the OCR sheet image as designed in form shown in FIGS. 1 and 2, and stores the OCR sheet image into the memory section 12 (Step S501). Then, the area to be input defining section 13 detects the reference position mark 3 from the pattern of the OCR sheet image stored in the memory section 12 at the reference position mark detecting section 131 (Step S502). Herein, the reference position mark 3 consists of a two dimensional shaped pattern so that the rotational shaped pattern of the mark 3 cannot be identical with the original pattern of the mark 3. In this point of view, the area to be input defining section 13 determines the rotational angle of the OCR sheet image two-dimensionally by the pattern shape of the reference position mark 3 at detection so as to correct the direction of the OCR sheet image regularly if the OCR sheet image is rotated from regular direction. The rotational angle compensation of the OCR sheet image may be skipped unconditionally if rotational angle compensation is already performed for the input the OCR sheet image.

The attribute information pattern recognizing section 132 determines the position of the attribute information pattern 4 by the position of the reference position mark 3 in the OCR sheet image stored in the memory section 12 (Step S503). As shown in FIG. 2, the attribute information pattern recognizing section 132 determines the attribute information pattern 4 by the left lower corner P2 of the pattern 4 that is located 10 mm left from the right lower corner P1 of the outline of the mark 3. Therefore, by recognizing the left lower corner P2 of the attribute information pattern 4, the position of the pattern 4 can be determined. The attribute information pattern recognizing section 132 locates and recognizes the attribute information pattern 4 to get the attribute information related to the area to be input. The attribute information is output for the area to be input defining section 13 (Step S504).

Then, the area to be input defining section 13 determines the position of the area 2 to be input by the position of the reference position mark 3 detected by the reference position mark detecting section 131 and the size information of the area 2 to be input contained in the attribute information related to the area 2 to be input which is obtained from the attribute information pattern recognizing section 132, and then, transfers the location thus determined for the area inputting section 14. Since the left upper corner P4 of the area 2 to be input is defined by the position which is shifted from the left lower corner P3 of the reference position mark 3 by 5 mm in the left direction and by 5 mm in the downward direction, the area to be input defining section 13 determines the coordinates of the left upper corner P4 of the area 2 to be input at first. Then, the area to be input defining section 13 determines the position of the area 2 to be input by the size information of the area 2 contained in the attribute information related to the area 2 which is obtained at the attribute information pattern recognizing section 132. Then, the area to be input defining section 13 transfers the coordinates of the area 2 to be input thus obtained to the area inputting section 14.

The area inputting section 14 performs a predetermined information inputting such as character recognition or image extraction for the image data of the area 2 to be input which is defined at the area to be input defining section 13.

The above-described operation will be repeated for another area to be input in the OCR sheet 1 (Step S507).

As described above, according to the OCR sheet-inputting device 10 in this embodiment, the position of the area 2 to be input can be determined on the information contained in the OCR sheet 1. Therefore, even though a plurality of areas to be input with the respective different sizes are arranged in the OCR sheet 1, the OCR sheet-inputting device 10 can determine the positions of the areas so as to perform the intended inputting appropriately such as character recognition for images of areas.

Then, an OCR sheet form drawing device in this embodiment will be described.

In this embodiment, the OCR sheet form drawing device is implemented as a typical computer hardware source, which is consisted of a CPU, a memory device (ROM, RAM), an input device (key board, mouse), a displaying device and the like, and a software such as a program for drawing an OCR sheet form. Alternatively, the OCR sheet form drawing program may be implement by plural computers, which are connected with one another via communication medium. Alternatively, a part or entire OCR sheet form drawing may be implement at an dedicated hardware. In this embodiment, the OCR sheet form data drawn by the OCR sheet form-drawing device may be stored in a removable memory medium by a recording device connected with the computer. Alternatively, the OCR sheet form data may be transferred to another computer via communication medium.

Figures 9, 10, 11:
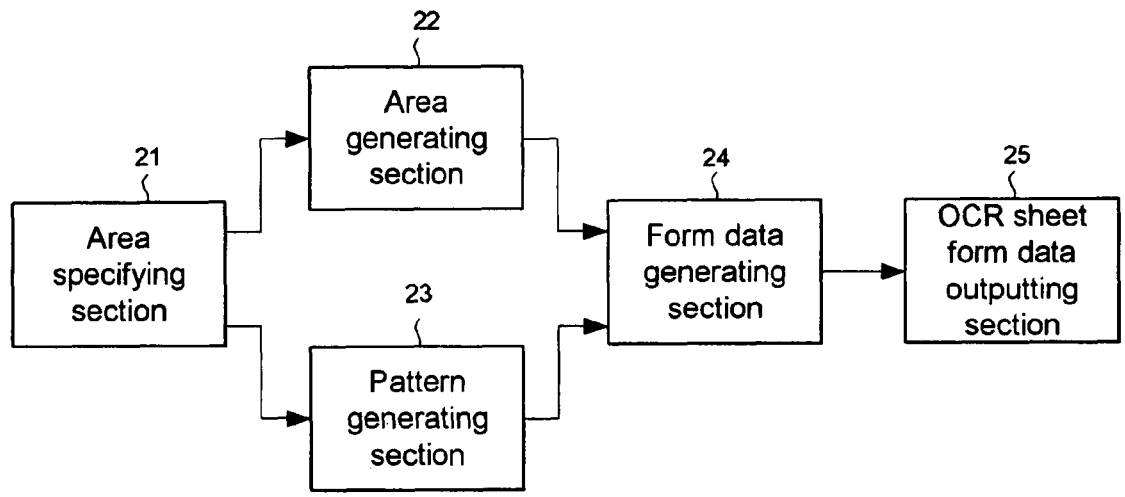
FIG. 9 is a functional block diagram for an OCR sheet drawing device according to an embodiment of the present invention.
FIG. 10 is a schematic view showing a text file in which definition information related to the area to be input is written.
FIG. 11 is a schematic view showing a GUI which is utilized by a user in the indication of the title of and the kind of content to be written in the area to be input.

FIG. 9 is a functional block diagram for the OCR sheet drawing device in this embodiment.

In this embodiment, the OCR sheet form drawing device 20 includes an area specifying section 21 to get the definition information of the area to be input which is drawn by a user, an area generating section 22 to generate the area to be input on the definition information of the area gotten by the area specifying section 21, a pattern generating section 23 to generate a pattern containing the reference position mark and the attribute information pattern on the definition information of the area to be input, a form data generating section 24 to generate an OCR sheet form data which is generated as a combination of the area to be input which is generated at the area generating section 22 and the pattern which is generated at the pattern generating section 23, and an OCR sheet data outputting section 25 to convert the OCR sheet form data which is generated by the form data generating section 24 into data (image data, vector data), which is able to be printed by a computer, which is running with a generic operating system and output the thus obtained converted data.

Then, the operation of the OCR sheet form drawing device 20 in this embodiment will be described.

First of all, the area specifying section 21 gets the definition information of the area to be input which is drawn by a user. The definition information may include a title, a position, a size, a content to be written. The definition information may be gotten in the form of text file which is to be formed by the user. The thus obtained text file may be read in the area specifying section 21.

FIG. 10 is a schematic view showing a text file in which definition information related to the area to be input. In the text file, a collection of definition information 31, 32, 33 of the areas to be input are written in corresponding lines. With the definition information 31 of the area to be input, "applicant" specifies a title, "10, 30" means a position, and "name" means a content to be written. As shown in FIG. 3, the position are expressed as two dimensional offset values (unit: mm, in the X-direction and the Y-direction) from the left upper corner P5 of the OCR sheet 1 to the left upper corner P6 of the area 2 to be input. The size means the lengths (unit: mm) along the X-direction and the Y-direction.

The definition information of the area to be input may be input by a GUI (graphical user interface).

Figure 12:
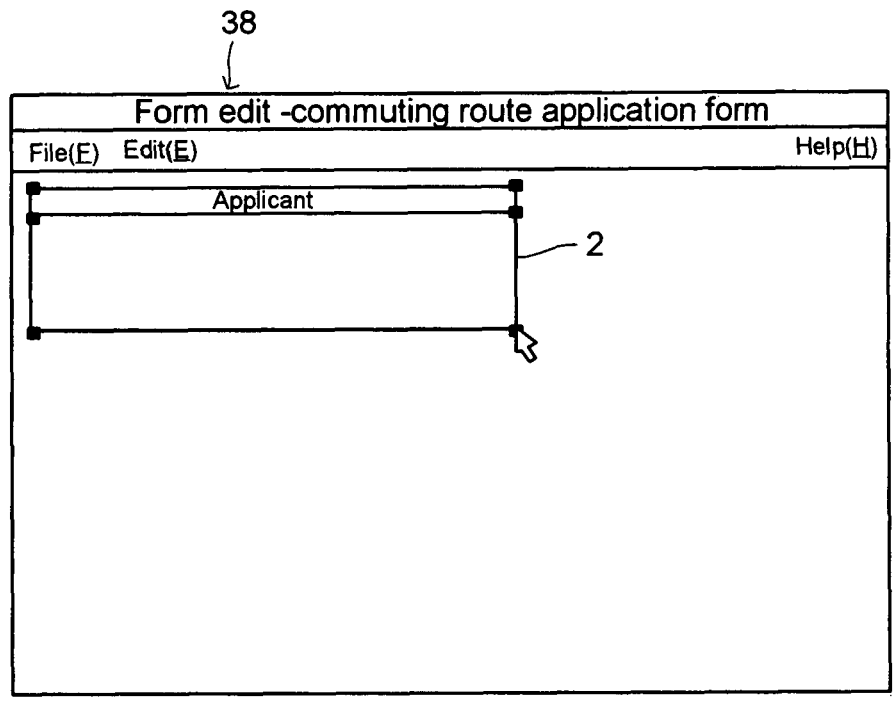
FIG. 12 is a schematic view showing a GUI which is utilized by a user in the indication of the position and the size of the area to be input.

FIG. 11 is a schematic view showing a window (dialogue box) as a GUI which is utilized by a user in the indication of the title and the kind of content to be written in the area to be input. The window 34 includes a text box 35 in which the title of the area to be input is input and a pull-down box 37 to indicate contents in a pull-down menu 36. FIG. 12 is a schematic view showing a form-editing window 38 as a GUI, which is utilized by a user in the indication of the position and the size of the area 2 to be input. In the form editing window 38, a user operates an input device such as a mouse and move the mouse cursor so as to indicate the position and the size of the area 2 to be input. The area specifying section 21 gets the title, kind of the content, the position and the size of the area, which is indicated by the user using the GUI.

Figure 13:
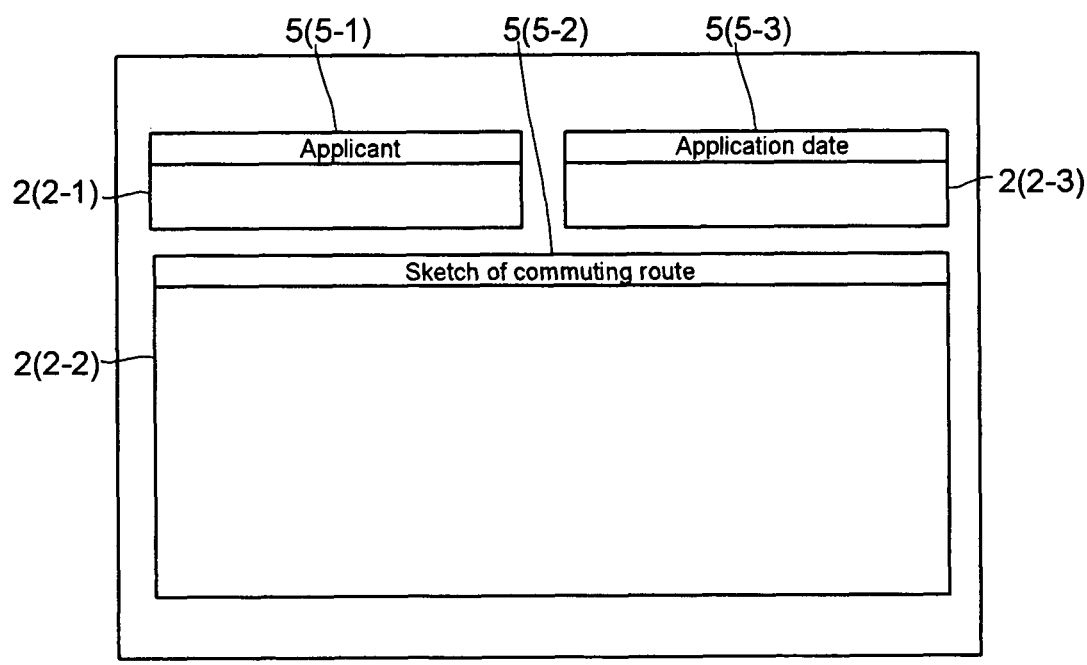
FIG. 13 is a schematic view showing an area to be input which is drawn by the definition information shown in FIG. 10.

Then, the area generating section 22 generates an area to be input by the definition information of the area gotten by the area specifying section 21, and draws the generated area on the display. FIG. 13 is a schematic view, which is showing how three areas 2 (2-1, 2-2, 2-3) are generated according to the definition information as listed in FIG. 10. In this case, the titles 5 (5-1, 5-2, 5-3) are added to the corresponding areas 2 (2-1, 2-2, 2-3) simultaneously.

Figure 14:
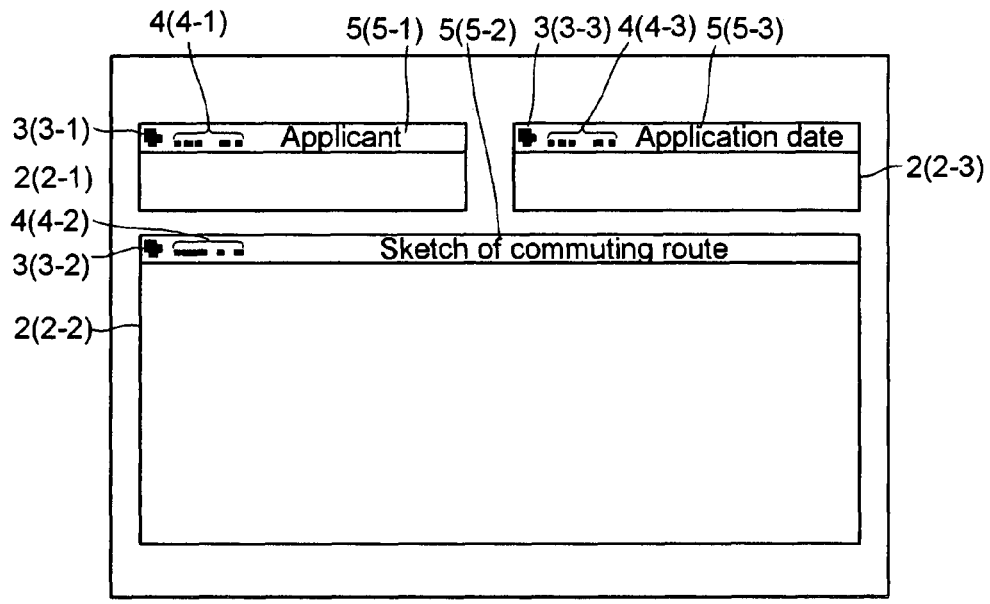
FIG. 14 is a schematic view showing an OCR sheet form which is drawn by the definition information shown in FIG. 10.

Then, the pattern generating section 23 generates a pattern containing the reference position mark 3 and the attribute information pattern 4 on the definition information of the area to be input. Since the position of area 2 relative to position mark 3 is defined, the position of the reference position mark 3 is determined by the position of the area 2 to be input. Since the relative position between the reference position mark 3 and the attribute information pattern 4 is defined, the position of the attribute information pattern 4 can be determined by the position of the reference position mark 3. As a result, as shown in FIG. 14, the intended OCR sheet form, in which the areas 2 (2-1, 2-2, 2-3) to be input as defined in FIG. 13, the reference position marks 3 (3-1, 3-2, 3-3) and the attribute information patterns 4 (4-1, 4-2, 4-3) are combined as a pattern, is to be generated.

Then, another embodiment of the OCR sheet form drawing device will be described.

Figure 15:
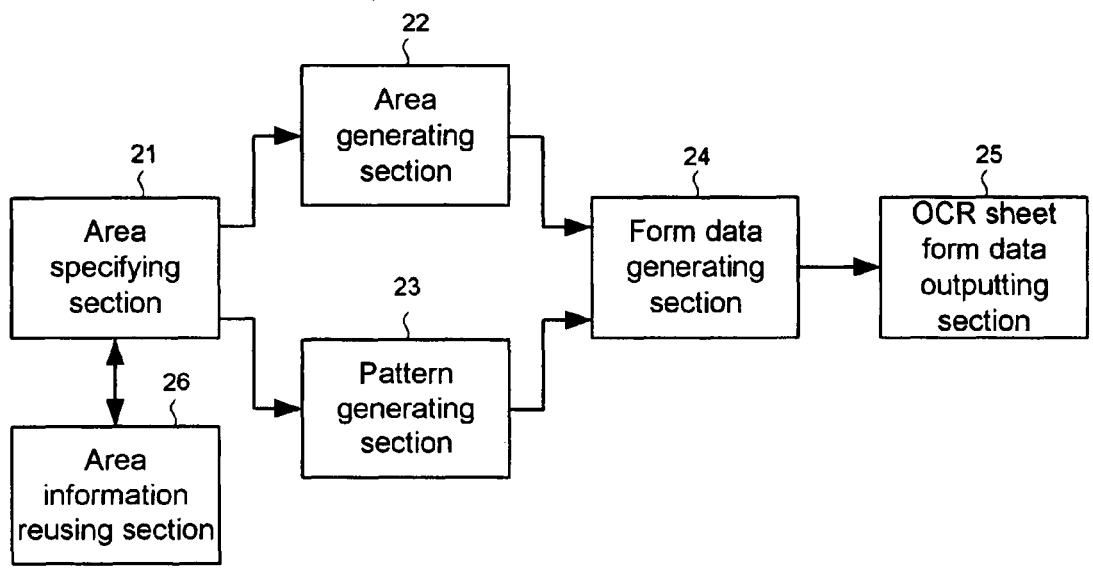
FIG. 15 is a functional block diagram for an OCR sheet drawing device according to another embodiment of the present invention.

FIG. 15 is a functional block diagram for the OCR sheet drawing device 30 in this embodiment.

As shown in FIG. 15, the OCR sheet drawing device 30 includes an area information reusing section 26 in addition to the sections of the OCR sheet form drawing device 20 shown in FIG. 9. The area information reusing section 26 is configured to provide the definition information of an area to be input to be newly generated for the area specifying section 21 by reusing the OCR sheet form data already generated.

Then, the concrete function of the area information reusing section 26 will be described.

Figure 16:
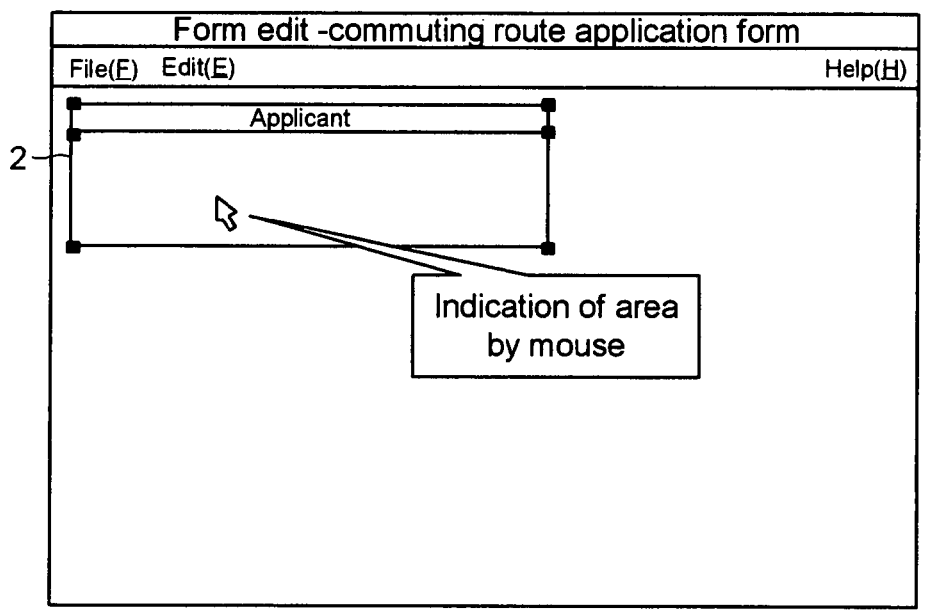
FIG. 16 is an explanatory view for the selection of an area to be input which corresponds to a function of an area information reusing section.
Figure 17:
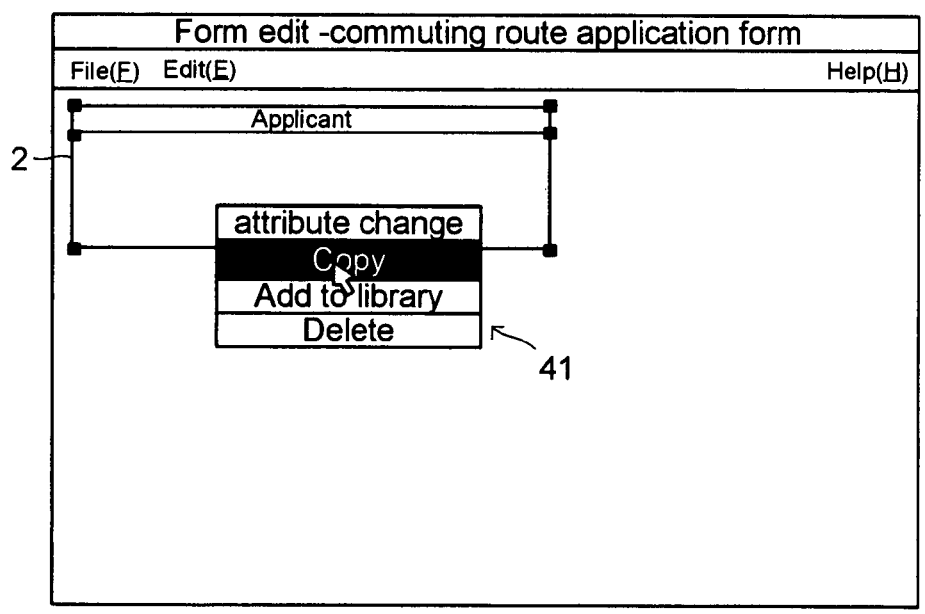
FIG. 17 is a schematic view for a menu display of inputting commands which corresponds to a function of an area information reusing section.

The area information reusing section 26 reads the OCR sheet form data already generated and displays the data as a template on the screen of a displaying device. As shown in FIG. 16, a user can select the intended area 2 to be input in the OCR sheet form displayed on the screen of the displaying device by mouse operation. When the intended area 2 is selected and then, clicked by right hand click operation, a menu 41 related to inputting commands, which can be applied for the area 2 to be input is displayed as shown in FIG. 17. When the user selects the intended command in the menu 41, the area information reusing section 26 performs the selected inputting command.

When the command "copy" is selected from the menu 41, the area information reusing section 26 adds a copy of the area 2 to be input as a new area 42 to be input to an area which is indicated by the user. By this operation, an area of which the title, the size and the contents are same as the ones of area 2 is generated. When the command "delete" is selected from the menu 41, the area information reusing section 26 deletes the selected area to be input.

When the command "attribute change" is selected from the menu 41, the area information reusing section 26 displays the dialogue box containing one or more contents to be changed related to the attribute information (content, size) of the selected area to be input so as to change the attribute information of the area using the one or more contents entered by the user in the dialogue box.

When the command "add to the library" is selected from the menu 41, the area information reusing section 26 registers the title, size, content of the selected area in the library. Herein, the "library" means a database to which some titles, sizes And contents are stored under the readable condition. For example, the library is installed in an external memory device such as a hard disk drive connected with a computer.

Figures 18, 19:
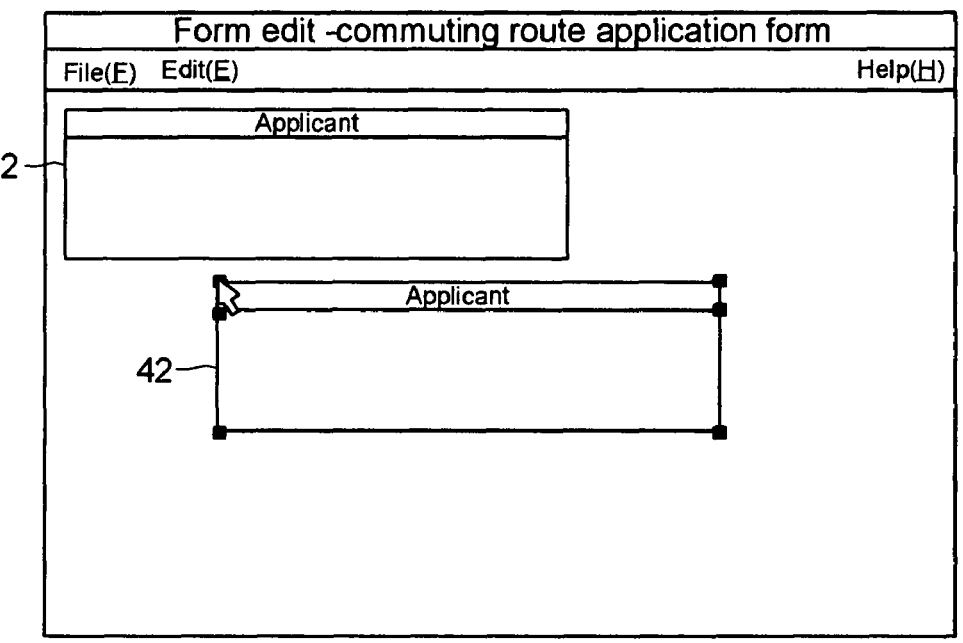
FIG. 18 is a schematic view for a copy operation of an area to be input which corresponds to a function of an area information reusing section.
FIG. 19 is a schematic view showing a displaying example of registration information in a library.

A command to display the contents of the library is prepared in the area information reusing section 26. When the user executes the command, the area information reusing section 26 displays the information related to all of the areas to be input which are stored in the library. FIG. 19 is a schematic view showing a displayed example of registration information in the library. The user may select information related to arbitrary area to be input for reuse.

The library allows the registration of partially unspecified information related to an area to be input. In FIG. 20, the content and size of the area are registered in the library, but the title of the area is not registered. If the user selects the information related to the area to be input containing the indefinite information in the library, the area information reusing section 26 displays the dialogue box 43 and let the user fill the indefinite information as shown in FIG. 21. In FIGS. 19 and 20, the title of the area is indefinite, but the horizontal and vertical size and the content of the area may be indefinite.

In the area information reusing section 26, one or more information of one or more areas to be input which are to be registered into the library from the OCR sheet form data are indicated by the user. But these may be registered by default.

Although the present invention is described in detail with reference to the above examples, this invention is not limited to the above disclosure and every kind of variation and modification may be made as long as the changes do not let the implementation depart from the scope of the present invention.

What is claimed is:

1. An OCR sheet-inputting device, comprising:
   an OCR sheet image input section for inputting an image of an OCR sheet containing an area in which information to be input is arranged and a pattern representing at least a reference position to define the position of said area and a size information of said area;
   a memory section for storing said image of said OCR sheet input by said OCR sheet image input section;
   a pattern recognizing section for detecting said reference position from said pattern of said image of said OCR sheet which is stored in said memory section and recognizing a size information of said area;
   an area specifying section for specifying the position of said area from said reference position detected by said pattern recognizing section and said size information of said area; and
   an area inputting section for inputting an image in said area defined by said area specifying section.

2. The OCR sheet-inputting device as set forth in claim 1, wherein said area is shaped rectangular and said area specifying section is configured to determine the position of a predetermined corner in said area on said reference position so as to determine by the position of said corner and said size information of said area.

3. The OCR sheet-inputting device as set forth in claim 1, wherein said pattern includes a pattern configured such that a rotational shape of said pattern is not identical with the original shape of said pattern under no rotation.

4. An OCR sheet used with the OCR sheet-inputting device as set forth in claim 1, comprising:
   an area for arranging information to be input; and
   a pattern to be detected by the pattern recognizing section for representing a reference position to specify the position of said area and a size information of said area.

5. The OCR sheet as set forth in claim 4, wherein said pattern is formed by use of a ruled line defining the outline of said area.

6. An OCR sheet form drawing device, comprising:
   an area specifying section for acquiring a definition information to define an area in which information to be input is arranged;
   an area generating section for generating said area by said definition information gotten by said area specifying section;
   a pattern generating section for generating a pattern to represent at least a reference position related to the position of said area and a size information of said area on said definition information gotten by said area specifying section; and
   a form data generating section for generating an OCR sheet form data which is obtained by the combination of said area which is generated by said area generating section and said pattern which is generated by said pattern generating section.

7. The OCR sheet form drawing device as set forth in claim 6, wherein said definition information includes information related to the position and size of said area.

8. The OCR sheet form drawing device as set forth in claim 6, further comprising an area information reusing section for storing, as a library, an attribute information containing a size information of said area, loading said attribute information of said area stored as said library by the indication of a user, and reusing said attribute information for generating a new area.

9. An OCR sheet used with the OCR sheet form drawing device as set forth in claim 6, comprising:
   an area generated by the area generating section for arranging information to be input; and
   a pattern generated by the pattern generating section for representing a reference position to specify the position of said area and a size information of said area.

10. The OCR sheet as set forth in claim 9, wherein said pattern is formed by use of a ruled line defining the outline of said area.

11. A machine readable storage having stored thereon a computer program to be executed by a device for inputting an OCR sheet, the device comprising:
    an OCR sheet image input section for inputting an image of an OCR sheet containing an area in which information to be input is arranged, and a pattern representing at least a reference position to define the position of said area and a size information of said area;
    a memory section for storing said image of said OCR sheet input by said OCR sheet image input section;
    a pattern recognizing section for detecting said reference position from said pattern of said image of said OCR sheet which is stored in said memory section and recognizing a size information of said area;
    an area specifying section for specifying the position of said area from said reference position detected by said pattern recognizing section and said size information of said area; and
    an area inputting section for inputting an image in said area defined by said area specifying section,
    wherein a computer is operated in accordance with said program.

12. A machine readable storage having stored thereon a computer program to be executed by a device for drawing an OCR sheet form, the device comprising:
    an area specifying section for acquiring a definition information to define an area in which information to be input is filled;
    an area generating section for generating said area on said definition information gotten by said area specifying section;
    a pattern generating section for generating a pattern to represent at least a reference position related to the position of said area and a size information of said area on said definition information gotten by said area specifying section; and
    a form data generating section for generating an OCR sheet form data which is generated by the combination of said area which is generated by said area generating section and said pattern which is generated by said pattern generating section,
    wherein a computer is operated in accordance with said program.

* * * * *